J. B. DEEDS & J. TOOLE.
NUT-LOCK AND BOLT.

No. 172,870. Patented Feb. 1, 1876.

Witnesses:
Inventors.
John B. Deeds.
Joseph Toole
Per. E. O. Krink, Atty.

UNITED STATES PATENT OFFICE.

JOHN B. DEEDS AND JOSEPH TOOLE, OF URBANA, ILLINOIS.

IMPROVEMENT IN NUT-LOCKS AND BOLTS.

Specification forming part of Letters Patent No. 172,870, dated February 1, 1876; application filed June 28, 1875.

*To all whom it may concern:*

Be it known that we, JOHN B. DEEDS and JOSEPH TOOLE, of Urbana, Champaign county, State of Illinois, have invented a new and useful Improvement in Nut-Locks and Bolts, of which the following is a description, reference being had to the accompanying drawings.

Figure 1:
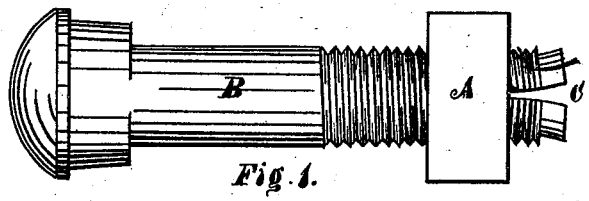
Figure 2:
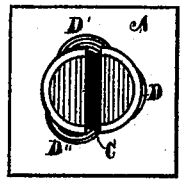
Figure 3:
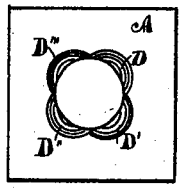

Figure 1 represents a side view of our improved nut-lock and bolt. Fig. 2 is an end view of the same. Fig. 3 is a plan of the outside of the nut.

Our invention consists in constructing a nut, A, with one or more notches or receptacles, D D' D'' D''', around the edges of the thread, thus forming grooves in which the end of the bolt B is spread by being split with a cold-chisel after the nut has been screwed home. The bolt is not split until the nut has been screwed on. Consequently the split portion C only extends a short distance in the nut. The portions thus swaged out enter one or more of the notched receptacles D, and prevent the nut from working loose, but do not hinder the nut from being removed when necessary. The nut then closes up the split part, which can be again spread open when the nut is replaced.

We are aware that split bolts have been used, but have been split the whole length of the thread. This weakens the bolt, and frequently one-half of the thread is broken off. We do not propose to split our bolt but only a portion of the way in the nut, just sufficient to swage the split portion into the notched recesses of the nut, which, as far as we are aware, is new.

What we claim, and wish to secure by Letters Patent, is—

The nut A, formed with one or more curved notches, D, which remove a portion of the thread and face of the nut, so as to receive the split portions of the bolt B when swaged or spread therein, substantially as described.

In testimony whereof we have signed our names to this specification in the presence of two subscribing witnesses.

JOHN B. DEEDS.
JOSEPH TOOLE.

Witnesses:
JEROME STALEY,
HENRY W. CALDWELL.